(12) United States Patent
Ishihata et al.

(10) Patent No.: US 7,931,534 B2
(45) Date of Patent: Apr. 26, 2011

(54) CONTROL PROGRAM FOR ACTION GAME

(75) Inventors: Yoshifumi Ishihata, Tokyo (JP);
Nobuyuki Yamashita, Tokyo (JP)

(73) Assignee: Sega Corporation, Tokyo (JP)

( * ) Notice: Subject to any disclaimer, the term of this patent is extended or adjusted under 35 U.S.C. 154(b) by 1482 days.

(21) Appl. No.: 10/721,150

(22) Filed: Nov. 26, 2003

(65) Prior Publication Data

US 2004/0176163 A1    Sep. 9, 2004

(30) Foreign Application Priority Data

Nov. 28, 2002   (JP) .................................. 2002-345055

(51) Int. Cl.
*A63F 13/04* (2006.01)
(52) U.S. Cl. .................... 463/30; 463/1; 463/33; 463/34
(58) Field of Classification Search .................... 463/14, 463/7, 1, 5, 30–33, 2, 34, 37
See application file for complete search history.

(56) References Cited

U.S. PATENT DOCUMENTS

| 4,019,745 | A  | * | 4/1977 | Mustelier ........................ 463/14 |
| 6,217,446 | B1 |   | 4/2001 | Sanbongi et al. |
| 6,283,861 | B1 | * | 9/2001 | Kawai et al. ..................... 463/43 |

FOREIGN PATENT DOCUMENTS

| JP | 10-165647 | 6/1998 |
| JP | 2001-232056 A1 | 8/2001 |

OTHER PUBLICATIONS

Galaxian Video Game, Namco 1979 -http://www.arcade-history.com/?n=galaxian&page=detail&id=901.*
Galaxian Video Game by Namco (1979)—The International Arcade Museum and the KLOV—http://www.klov.com/game_detail.php?game_id=7885.*
Galaxian game play, 1979 -http://www.pbcausa.org/Games/Galaxian.asp.*
1998 Hasbro Interactive and MicroProse, Inc, Falcon 4.0 game manual, 1998.*

(Continued)

*Primary Examiner* — James S. McClellan
*Assistant Examiner* — Damon J. Pierce
(74) *Attorney, Agent, or Firm* — Dickstein Shapiro LLP

(57) ABSTRACT

A control program for an action game according to the present invention in which one of a plurality of characters moving in a game space is selected to be an attack target, in response to an operation of a game player, comprises: a selectable candidate object judging step of judging each of said plurality of characters as to whether or not it is a selectable candidate object which is qualified to be an attack target and which is in position relationship which could be selected as an attack target, a selection order deciding step of deciding an order of selecting those of said plurality of selectable candidate objects, which have been judged by the selectable candidate object judging step; and an attack target changing step of selecting, based on the selection order decided by the selection order deciding step, one of said plurality of characters as an attack target and sequentially changing the attack target in response to an attack target changing operation by the game player. The control program permits one of a plurality of characters contained in a game space to be efficiently selected as a game target.

8 Claims, 11 Drawing Sheets

OTHER PUBLICATIONS

Jan. 14, 2000 issue (Biohazard 3 Last Escape) of Dengeki Play Station, Kabushiki Kaisha Media Works, Jan. 14, 2000, vol. 6, No. 1, p. 12.

January issue (Planet Harriers) of ARCADIA, Kabushiki Kaisha Enter Brain, Jan. 1, 2001, vol. 3, No. 1, pp. 76-81.

Biohazard 3 Last Escape Official Guide Book—Escape Execution—First Edition, Kabushiki Kaisha Capcom, Oct. 6, 1999, First Edition, pp. 28-29.

* cited by examiner

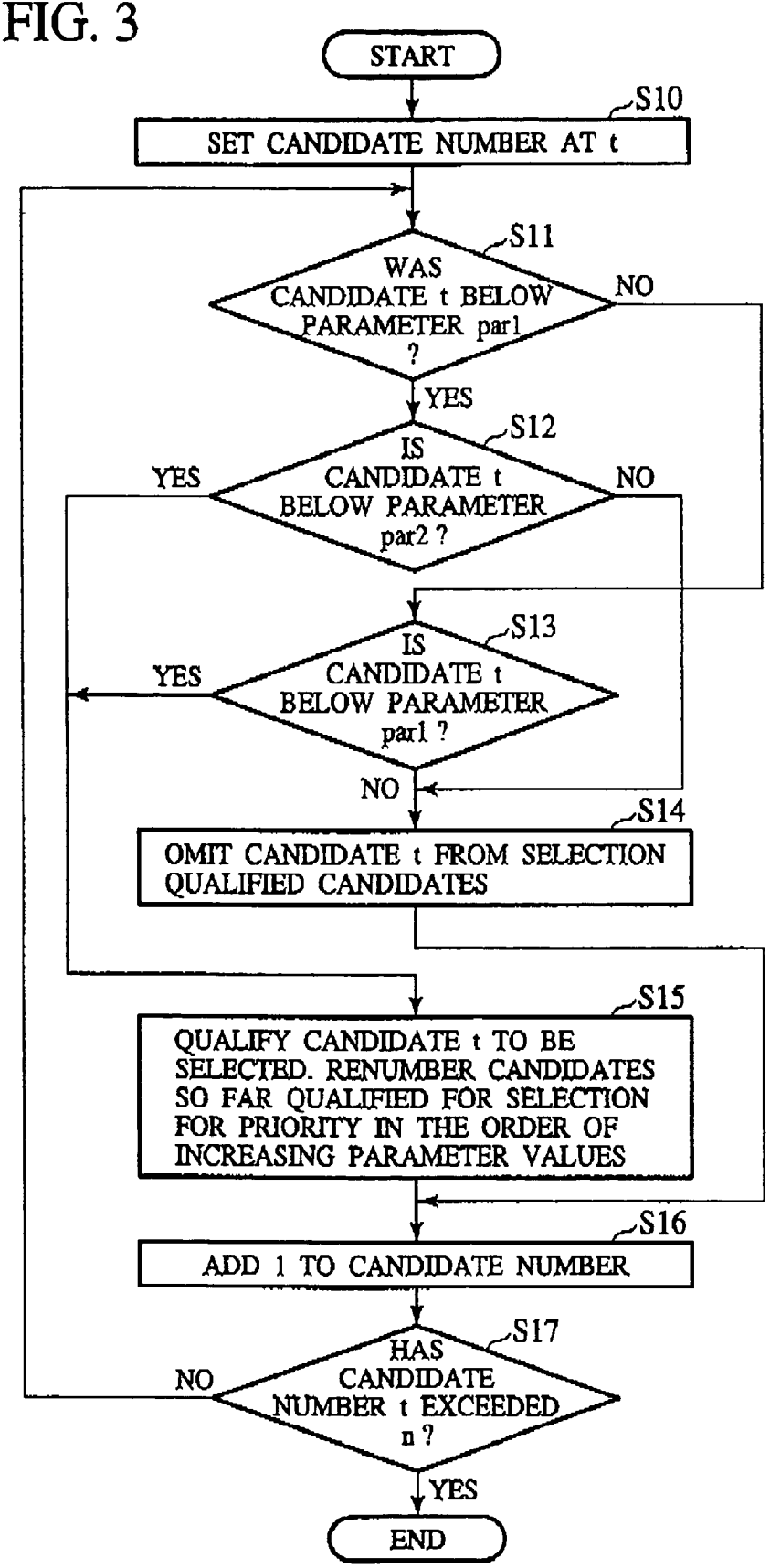

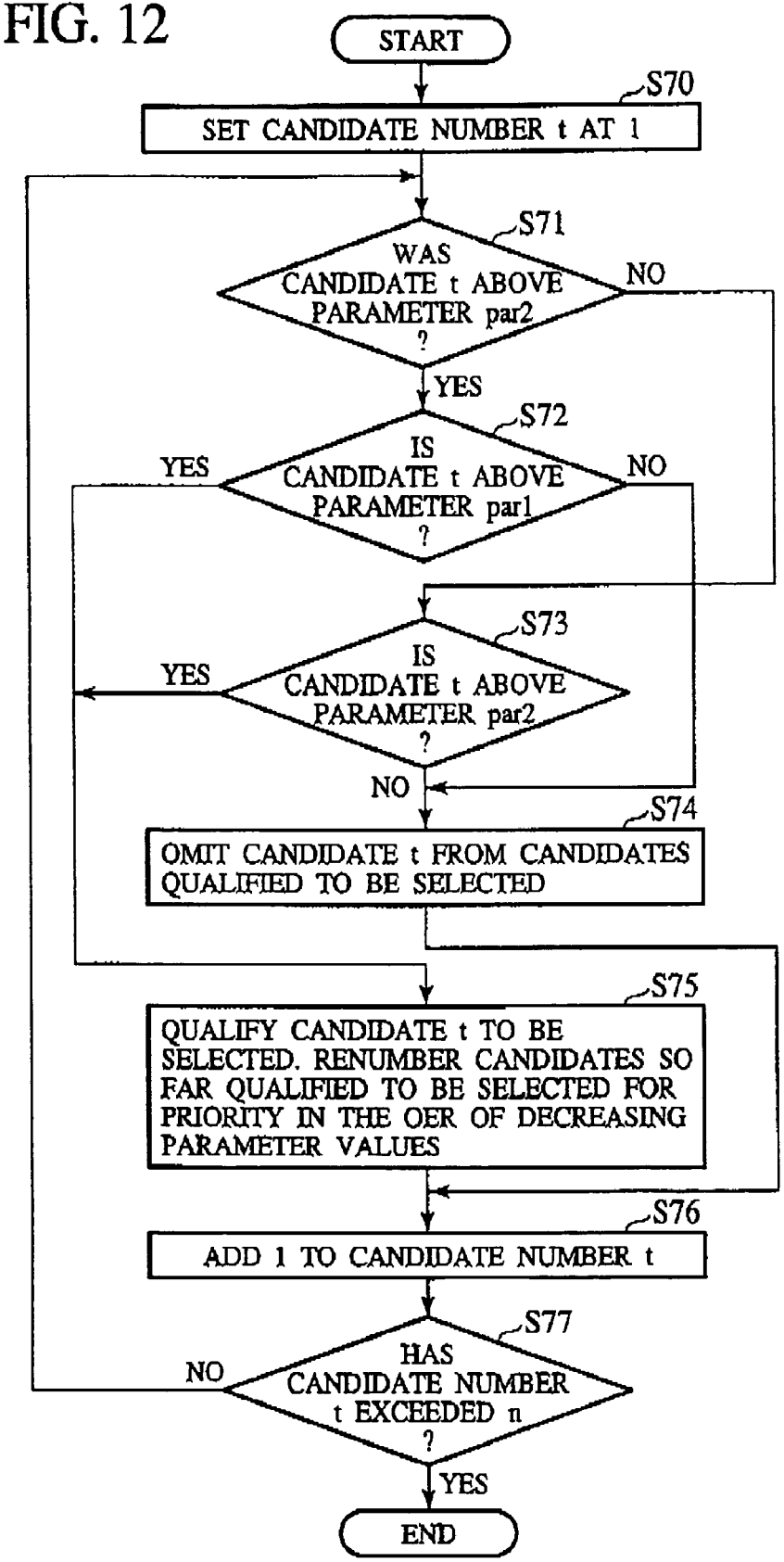

CONTROL PROGRAM FOR ACTION GAME

BACKGROUND OF THE INVENTION

The present invention relates to a control program for an action game in which one of a plurality of characters moving in a game space is selected to be an attack target, in response to an operation of a game player.

In the so-called arcade game apparatuses installed in game centers, etc., game players compete with each other, or a game player and a computer compete with each other by firing guns or others have been continuously popular.

With the recent speed-up of the computer processing and development of the computer graphic technique, the so-called 3D games using three-dimensional, cubic image displays are usual. The 3D games are dominant in the competing games. Realistic games can be enjoyed. However, game operations by the game players are increasingly complicated, which requires high skill of the game players. This will not find it difficult to make the games enjoyable only by manias.

Then, game apparatuses assist the game players in operations so that even beginners can easily enjoy the games. To give an example, the selection operation of a game player selecting characters for the game player to attack out of a plurality of characters is provided, and when the game player selects one character, the bullet aimed at the character is recognized as a hit even if the bullet is a little off the character while the direction of the character of the game player is controlled to automatically face toward the selected character by a prescribed operation even if the selected character is not looking toward the character of the game player.

In order to make the selection operation simple, in which a character is selected prior to an attack so that the competing game can be enjoyed by any one, a game apparatus automatically places a plurality of characters to be sequentially qualified for selection, and a game player operates to select those of the thus qualified characters. For example, a plurality of characters are numbered, and the game apparatus qualifies the plurality of characters to be selected in the order of the numbers, and the character having the last number is followed by the character of the first number so as to sequentially qualify the characters.

When characters in a game space is few, the above-described control method of sequentially qualifying characters to be selected can qualify all the characters to be selected in a short period of time, which facilitates a game player selecting characters.

However, when characters in the game space are many, it takes considerable time to qualify all the many characters to be selected, which disadvantageously makes it difficult for a game player to efficiently select characters.

Some of the characters in the game space may be outside the view of a game player, and even when such characters are qualified to be selected in the game, he cannot know it, which has often confused the game player.

SUMMARY OF THE INVENTION

An object of the present invention is to provide a control program for an action game which allows a game player to efficiently select a character as a game target out of a plurality of characters contained in a game space.

The above-described object is attained by a control program for an action game in which one of a plurality of characters moving in a game space is selected to be an attack target, in response to an operation of a game player, comprising: a selectable candidate object judging step of judging each of said plurality of characters as to whether or not it is a selectable candidate object which is qualified to be an attack target and which is in position relationship which could be selected as an attack target; a selection order deciding step of deciding an order of selecting those of said plurality of selectable candidate objects, which have been judged by the selectable candidate object judging step; and an attack target changing step of selecting, based on the selection order decided by the selection order deciding step, one of said plurality of characters as an attack target and sequentially changing the attack target in response to an attack target changing operation by the game player.

The above-described object is attained by a control program for an action game in which one of a plurality of characters sequentially moving in a game space is selected to be an attack target, in response to an operation of a game player, comprising a selection candidate qualification judging step of judging each of said plurality of characters as to whether or not he is qualified to be an attack target and has a positional relationship which qualifies him to be selected as an attack target; a selection order deciding step of deciding an order of selecting those of said plurality of candidates, who have been judged qualified to be selected; and an attack target changing step of selecting, based on the selection order decided by the selection order deciding step, one of said plurality of characters as an attack target and sequentially changing the attack target in response to an attack target changing operation by the game player, wherein in the candidate selection qualification judging step, a candidate who has been judged qualified to be selected is included in the candidates to be selected by the attack target selection step for a prescribed period of time since he fails to satisfy the prescribed condition, and when the candidate again satisfies the prescribed condition, a count of the prescribed period of time is reset.

The above-described object is attained by a control program for an action game in which one of a plurality of characters sequentially moving in a game space is selected to be an attack target, in response to an operation of a game player, comprising a selection candidate qualification judging step of judging each of said plurality of characters as to whether or not he is qualified to be an attack target and has a positional relationship which qualifies him to be selected as an attack target; a selection order deciding step of deciding an order of selecting those of said plurality of candidates, who have been judged qualified to be selected; and an attack target changing step of selecting, based on the selection order decided by the selection order deciding step, one of said plurality of characters as an attack target and sequentially changing the attack target in response to an attack target changing operation by the game player, wherein in the candidate selection qualification judging step, a candidate who has been judged qualified to be selected is included in the candidates to be selected by the attack target selection step while he is outside the selection qualifying range and in the range further remote by a prescribed distance.

BRIEF DESCRIPTION FO THE DRAWINGS

FIG. 3. is the flow chart of the limitation control based on parameters (part 1) in the selection operation of game targets according to the embodiment of the present invention.

Figure 4:
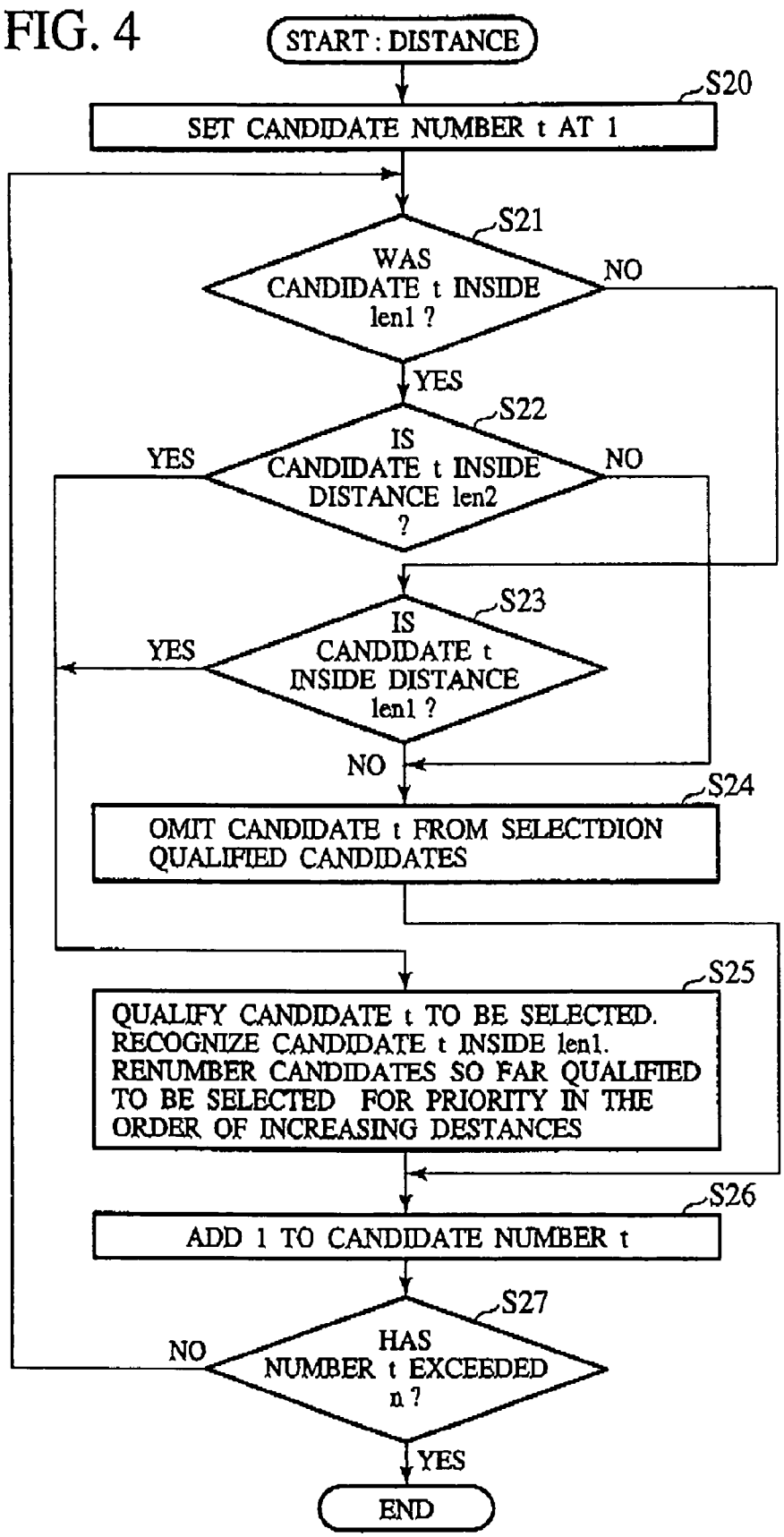

FIG. 4 is the flow chart of the limitation control based on distances in the game space in the selection control of game targets according to the embodiment of the present invention.

Figure 5:
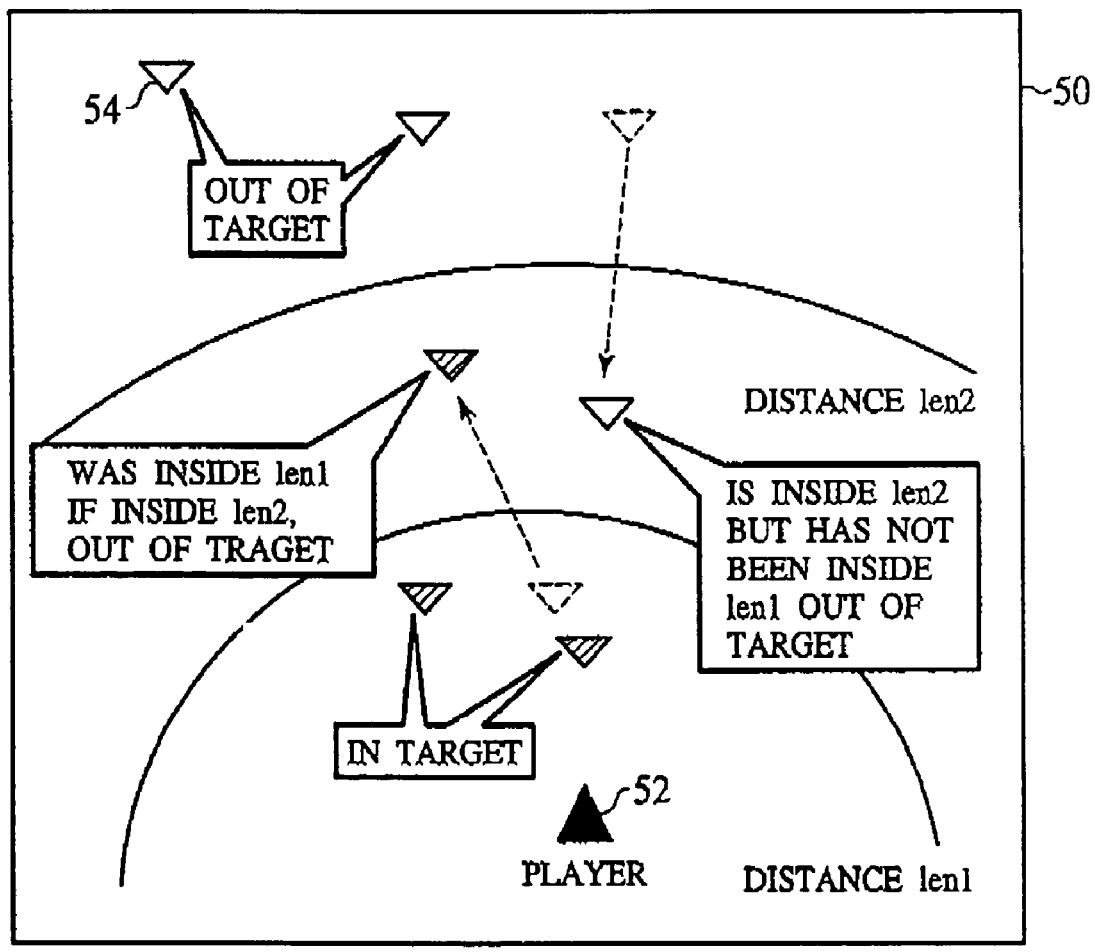

FIG. 5 is a view explaining the limitation control based on distances in the game space in the selection control of game targets according to the embodiment of the present invention.

Figure 6:
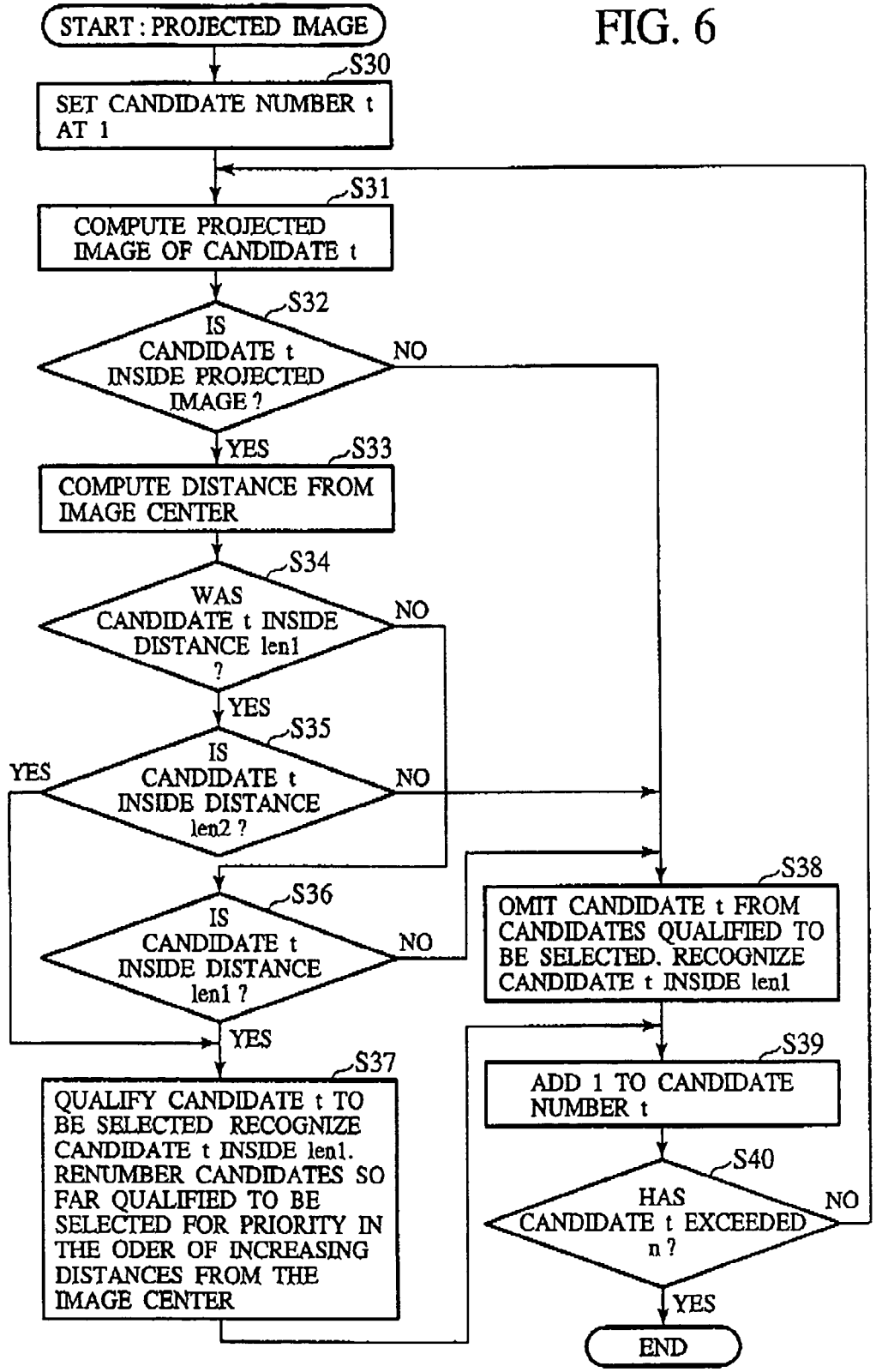

FIG. 6 is the flow chart of the limitation control based on distances on a projected display in the selection control of game targets according to the embodiment of the present invention.

Figure 7:
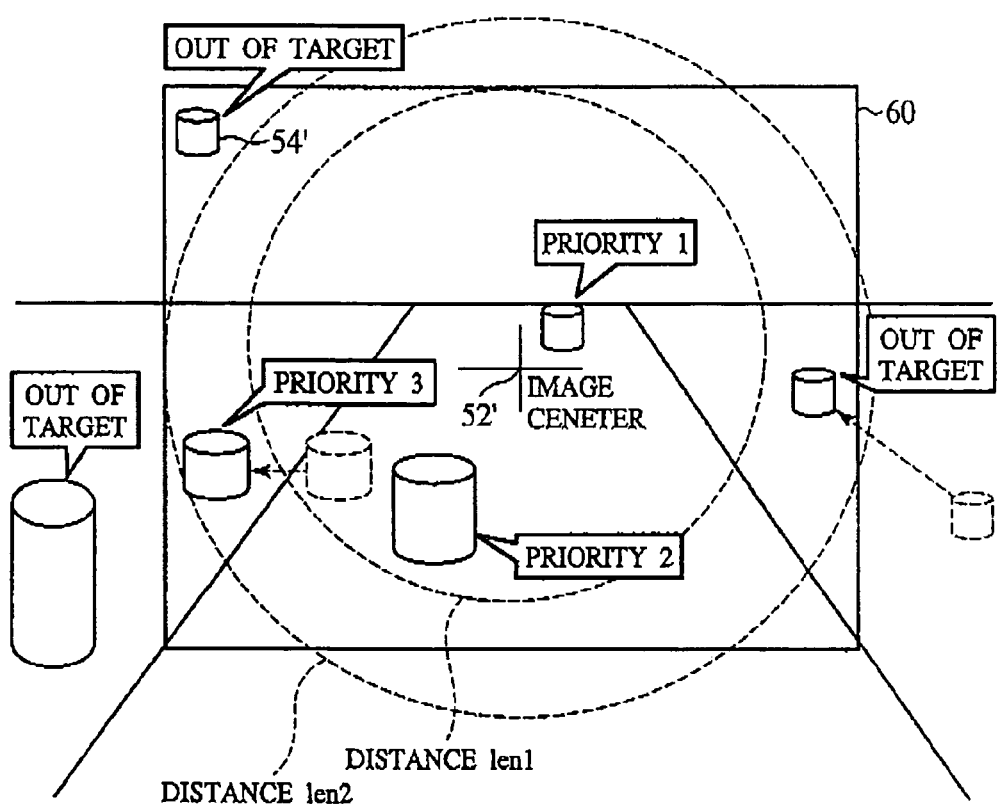

FIG. 7 is a view explaining the limitation control based on distances on the projected display in the selection control of game targets according to the embodiment of the present invention.

Figure 8:
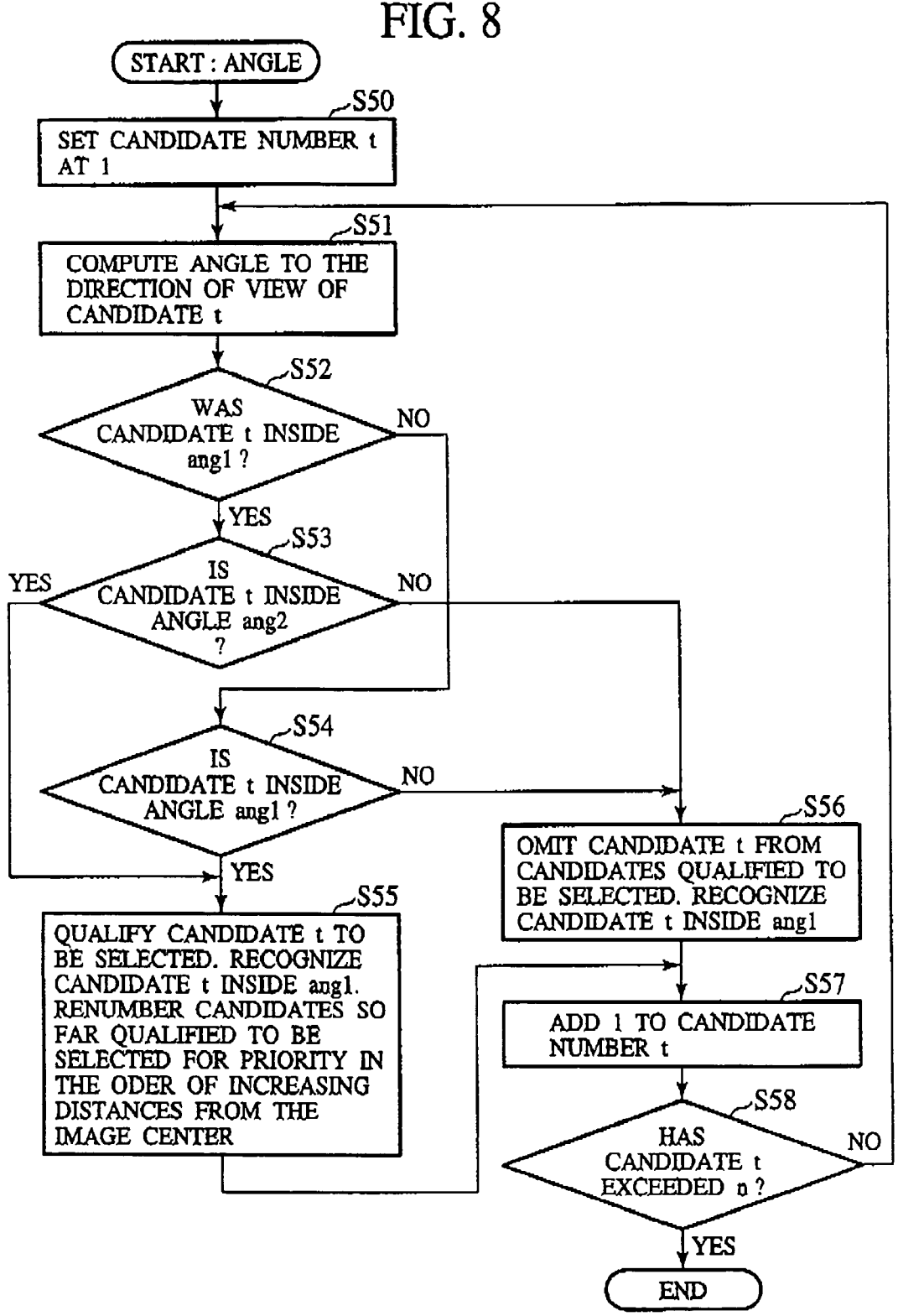

FIG. 8 the flow chart of the limitation control based on angles in the game space in the selection control of game targets according to the embodiment of the present invention.

Figure 9:
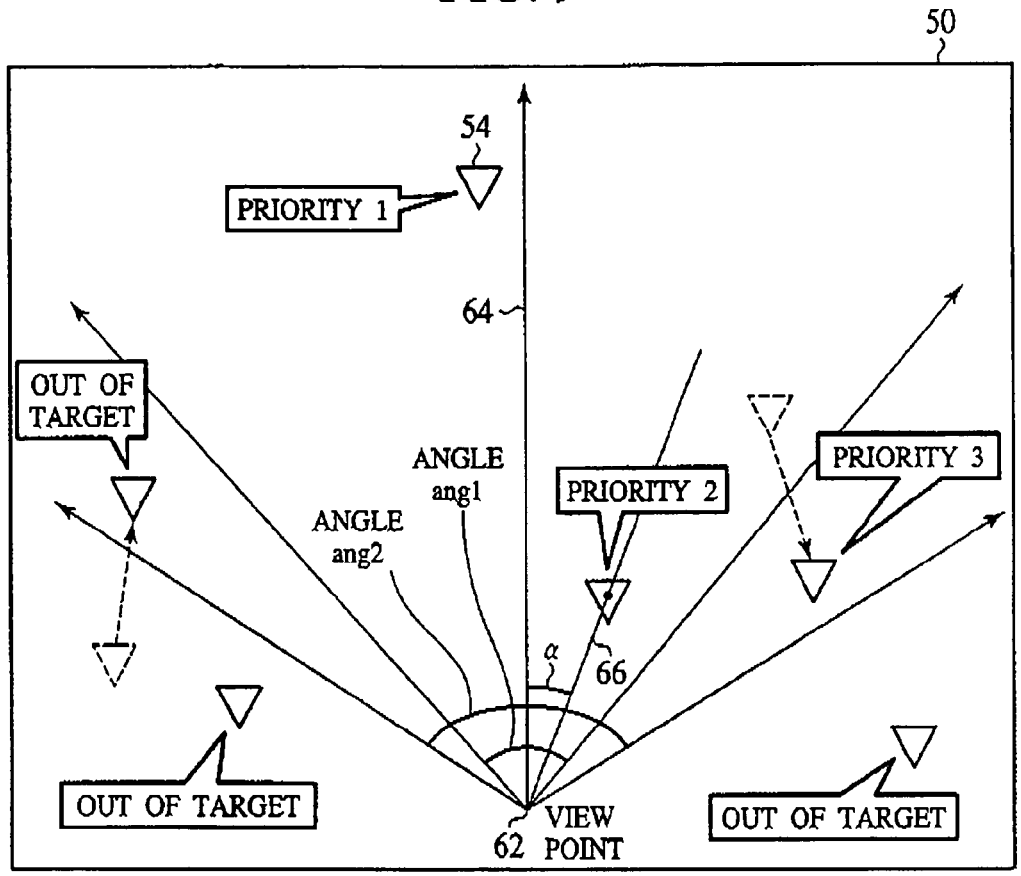

FIG. 9 is a view explaining the limitation control based on angles in the game space in the selection control of game targets according to the embodiment of the present invention.

Figure 10:
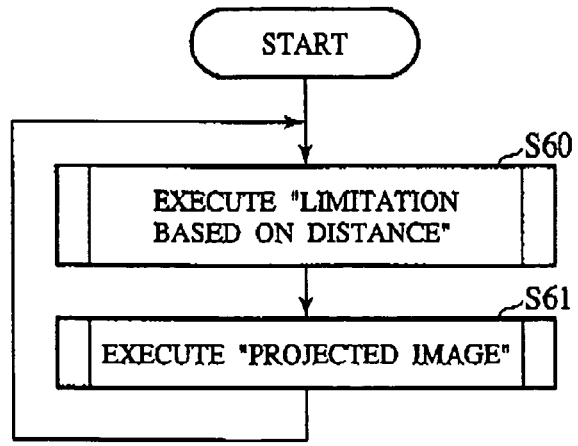

FIG. 10 the flow chart (part 1) of the limitation control based on composite conditions in the selection control of game targets according to the embodiment of the present invention.

Figure 11:
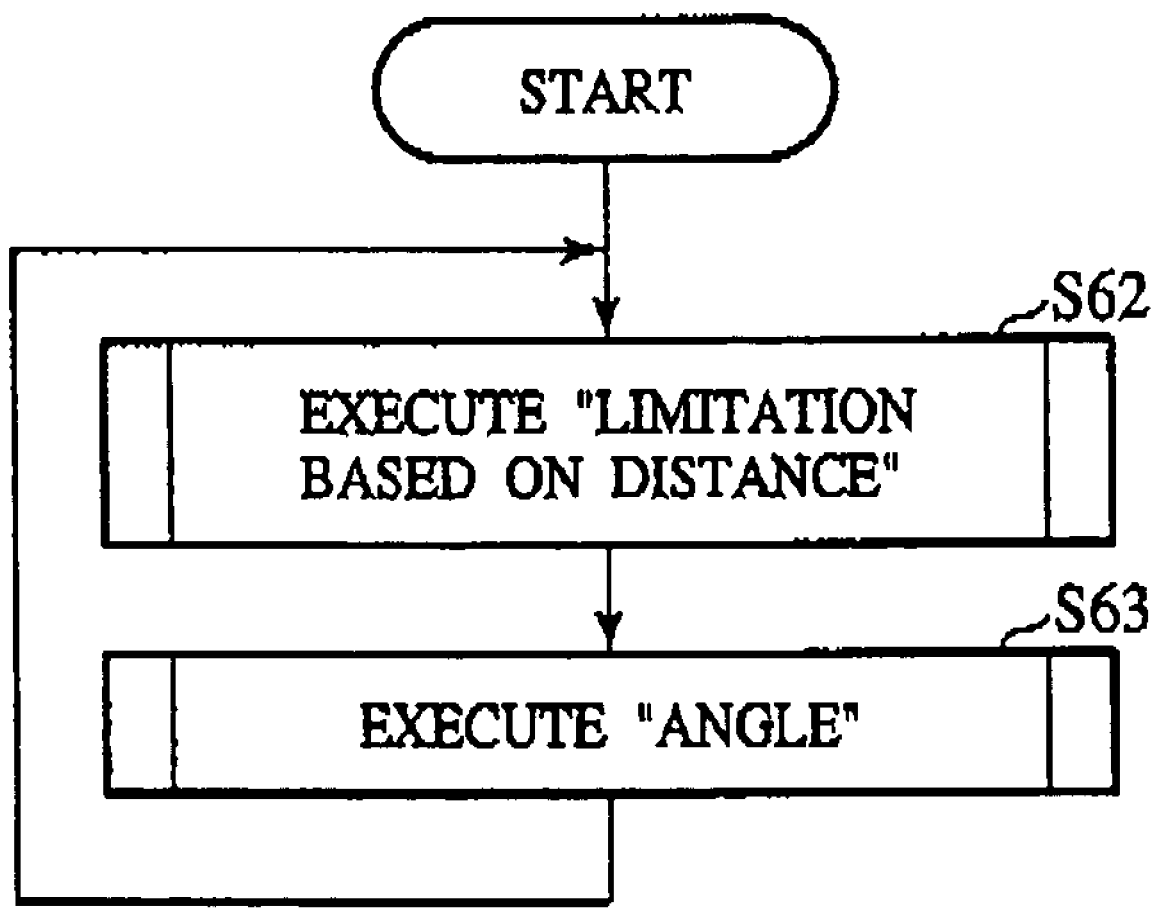

FIG. 11 the flow chart (part 2) of the limitation control-based on composite conditions in the selection control of game targets according to the embodiment of the present invention.

FIG. 12 is the flow chart of the limitation control (part 2) based on a parameter in the selection control of game targets according to the embodiment of the present invention.

DETAILED DESCRIPTION OF THE INVENTION

One Embodiment

The game control method according to one embodiment of the present invention will be explained. The game control method according to the present embodiment is performed by a control program for an action game in which one of a plurality of characters sequentially and successively moving in real time in a game space is selected by operations of a game player.

(Information Processing System)

A structure of a game apparatus exemplifying the information processing system for executing the game control method according to the present embodiment will be explained with reference to FIG. 1.

The information processing system 10 is not essentially a domestic game apparatus and can be a portable game apparatus or a portable terminal, such as a portable telephone, a PHS, a PDA or others. The information processing system 10 can be a terminal device installed in stores, such as game centers, game cafes or other game centers, and an electronic device, such as a personal computer or others installed at homes.

Figure 1:
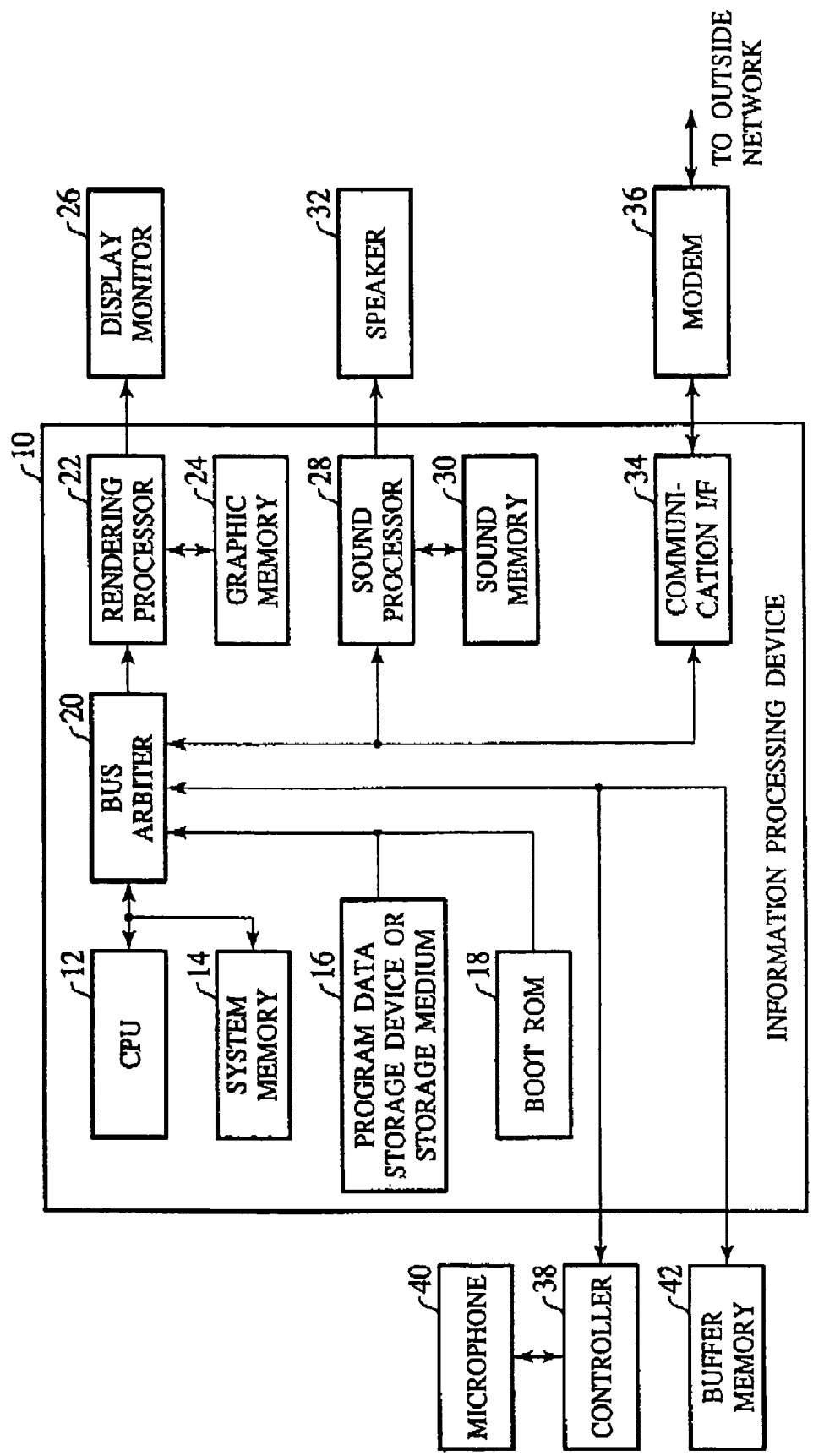
FIG. 1 is a block diagram of a game apparatus for executing the game control method according to one embodiment of the present invention.

In the information processing system 10, as shown in FIG. 1, a CPU 12 which performs coordinate computation, etc. for the execution of a game program and the general control of the system, and a system memory (RAM) 14 used as a buffer memory for storing programs and data necessary for the CPU 12 to perform processing are connected to a bus arbiter 20 by a common bus line. The bus arbiter 20 controls the flows of programs and data to the respective blocks of the information processing blocks and outside devices.

A program/data storage or a storage medium 16 (including also optical discs, optical drives, etc. for driving CD-ROM, etc. as game storage mediums) storing game programs and data (including also image data and music data), and a BOOTROM 18 storing programs and data for actuating the information processing system 10 are connected to the bus arbiter 20 via a bus line.

A rendering processor 22 which reproduces movie (MOVIE) data read from the program data storage or the storage medium 16 and produces images to be displayed in response to operations of a game player and advances of the game, and a graphic memory 24 storing graphic data, etc. necessary for the rendering processor 22 to produce images are connected via the bus arbiter 20. Image signals outputted from the rendering processor 22 are converted from digital signals to analog signals by a video DAC (not shown) to be displayed on a display monitor 26.

A sound processor 28 which reproduces music data read from the program data storage or a storage medium 16 and produces effect sounds and voices in accordance with operations of the game player and advances of the game, a sound memory 30 storing sound data, etc. necessary for the sound processor 28 to produce effect sound and voices are connected via the bus arbiter 20. Audio signals outputted from the sound processor 28 are converted from digital signals to analog signals by an audio DAC (not shown) to be outputted at a speaker 32.

A communication interface 34 is connected to the bus arbiter 20. The communication interface 34 is connected to outside networks, such as a telephone circuit, etc. via a modem 36. The information processing system 10 is connected by the modem 36 to internets via the telephone circuit. The communication interface 34 and the modem 36 use telephone circuits but may use other communication means, such as telephone circuits using terminal adapters (TA) and rooters, cable television circuits using cable modems, radio communications using portable telephones and PHS, optical fiber communications using optical fibers, etc.

A controller is connected to the bus arbiter 20 and outputs to the game apparatus 10 signals for controlling the information processing system 10 and devices connected thereto outside. A microphone 40 is connected to the controller for inputting voice signals. A keyboard (not shown) may be connected to the bus arbiter 20 so as to facilitate inputting letters by an operator.

An outside backup memory 2 is connected to the bus arbiter 20 to store specific information, etc. of a operator of the game apparatus.

When the information processing system 10 is a personal computer or others other than the game apparatus, the information processing system 10 has basically the same structure as shown in FIG. 1.

(Operation of Selecting Game Target)

The basic control of the operation of selecting a game target in the game control method according to the present embodiment will be explained with reference to FIG. 2.

Figure 2A:
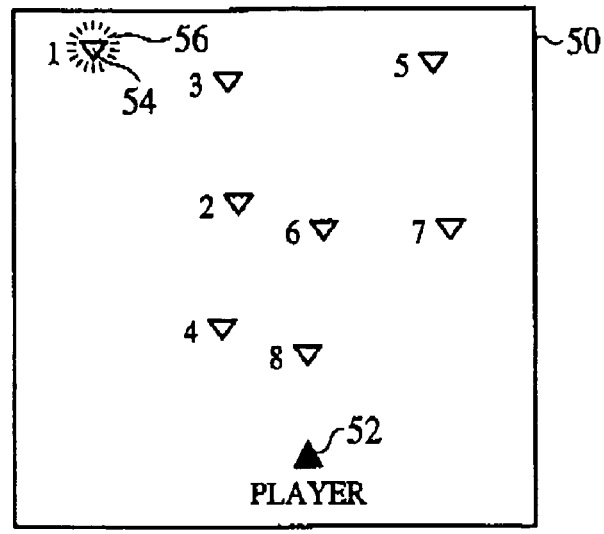
FIG. 2 is views explaining the basic control of the selection operation of game targets in the game control method according to the embodiment.

In the game control method according to the present embodiment, as exemplified in FIG. 2A, a player character 52 operated by a game player, and a plurality of enemy characters 54 controlled by a computer are contained in a game space 50. The game player operates the player character 52 to attack the enemy characters 54.

The enemy characters 54 can be the characters operated by the other game players so that the game players compete, or can include characters operated by other game players.

An online game is formed, and the game player 52 may play the game in a team with other game players connected on line or may compete with a team of other game players connected on line. The enemy characters 54 may be the player characters operated by the game players of a competing team.

The game is played by the game player operating the player character 52 to aim at and attack the enemy characters 54 in the game space. The game players' own character 52 and the enemy characters 54 can freely move in the three-dimensional game space 50, and it requires high operational techniques to aim at and accurately shoot the enemy characters 54 the game player wants to shoot.

Then, in the game control method according to the present embodiment, the operation of the game apparatus assists the operation of the game player. A plurality of enemy characters 54 are serially numbered (1, 2, 3, ...) as shown in FIG. 2A, and the enemy characters 54 are qualified to be selected in the order of serial numbers by a simple operation of the game player. On the game display screen, the mark 56 is displayed around the enemy character 54 who is qualified to be selected so as to indicate that he has been qualified to be selected. The enemy character numbered 1, the enemy character 54 numbered 2, the enemy character 56 numbered 3, ... are sequentially qualified to be selected, and the enemy character numbered 1 follows the eighth enemy character 54.

Figure 2B:
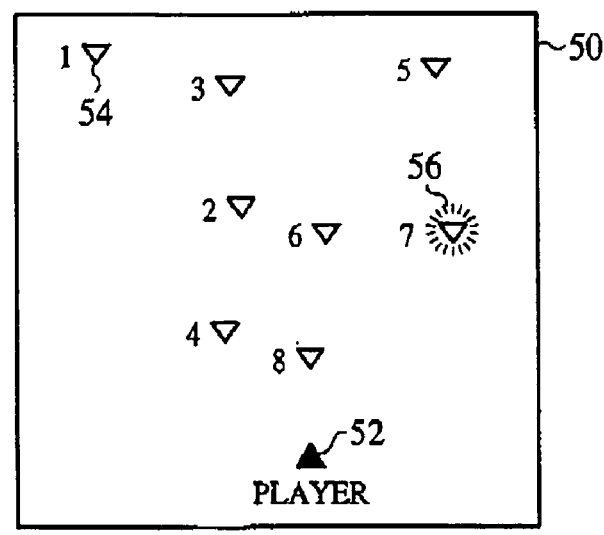
Figure 2C:
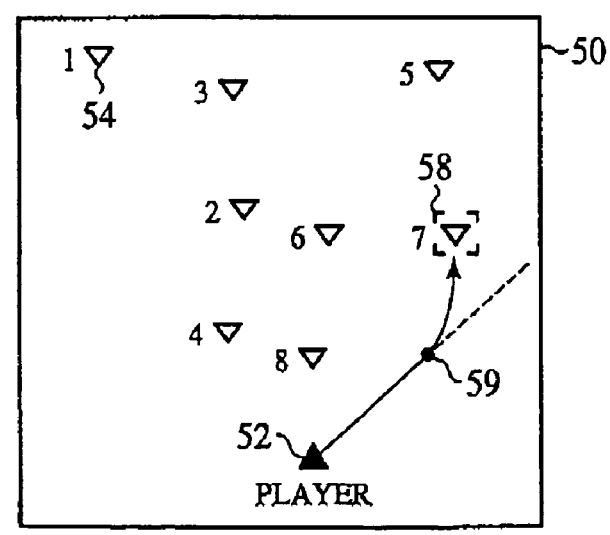

When the game player is going to attack the seventh enemy character 54, as shown in FIG. 2B, the game player makes a prescribed operation to select the 7th enemy character 54 as a game target. As shown in FIG. 2C, another mark 58 which indicates that the enemy character 54 has been qualified is made around the enemy character 54.

After having selected the enemy character 54 numbered 7, the game player shoots the enemy character 54 by operating the player character. When the shooting is a little off the target as shown in FIG. 2C, the discharged bullet 59 curves to hit the enemy character 54 numbered 7, that is the game target.

When many enemy characters 54 are present in the game space 50, it takes considerable time to sequentially qualify the enemy characters 54 to be selected, which makes it difficult for the game player to efficiently select a character he wants to select. Then, in the present embodiment, the game apparatus controls to assist a game player also in the operation of selecting a game target.

In the present specification, these enemy characters 54, characters of other game players, etc. are called generally "candidates", as required. The "candidates" are for the attack targets.

(Limitation Based on a Parameter (Part 1))

The control of limiting candidates based on a parameter (Part 1) for the selection qualification for game targets in the present embodiment will be explained with reference to FIG. 3.

In such limitation control, a prescribed parameter of candidates, such as enemy characters 54, etc., is used. A prescribed parameter of this example is more suitable to qualify candidates to be selected as its value is smaller, as represented by a distance between a player character 52 and a candidate 54 in the game space. That is, when the parameter has too a large value, the parameter makes a candidate unnecessary to be qualified to be selected.

In the limitation control of this example, in principle, a candidate whose parameter value is below par1 is qualified to be selected, and a candidate whose parameter value is above par1 is not qualified to be selected. However, those of candidates, whose parameter values are above par1 and below par2 (>par1), but were below par1 before a prescribed period of time are qualified to be selected, but the rest candidates are not qualified to be selected.

The operation of the limitation control of this example will be explained with reference to the flow chart of FIG. 3. Candidates (enemy characters, etc.) contained in the game space have been serially numbered (1, 2, 3, ...).

First, a candidate number t which is used as a counter value in the limitation control is set at the initial value "1" (step S10).

Then, it is judged whether or not a parameter value of the candidate numbered t, i.e., a parameter value of the candidate t, was below before a prescribed period of time than par1 (step S11). When the parameter value was below par1 before the prescribed period of time, then it is judged whether or not a current parameter value of the candidate t is below par2 (step S12). When the current parameter value is below par2, step S15 follows, and otherwise, step S14 follows.

In step S11, when the parameter value of the candidate t was not below par1 before the prescribed period of time, then it is judged whether or not the current parameter value of the candidate t is below par1 (step S13). When the current parameter value is below part 1, then step S15 follows, and otherwise, then step S14 follows.

When step S14 follows, the candidate t is omitted from candidates who are to be qualified for the selection. When step S15 follows, the candidate t is qualified for the selection while candidates who have been so far qualified for the selection are renumbered for priority in the order of increasing parameter values.

Then, 1 is added to the candidate number t (step S16). It is judged whether or not the candidate number t has reached n which is a total candidate number n (step S17), and the processing of steps S11-S17 is repeated until the candidate number t reaches n.

In the flow chart of FIG. 3, whether or not a parameter value of the candidate t was below par1 before the prescribed period of time is first judged, and then whether or not a current parameter value of the candidate number t is below par1 or par2 is judged. However, this sequence is not essential.

For example, it may be judged first whether or not a current parameter value of the candidate t is below par, above par1 but below par2, or above par2, and then it may be judged whether or not a parameter value of the candidate t was below par1 before the prescribed period of time. Thus, the candidates are limited to those whose current parameter values are above par1 but below par2, those whose parameter values were below par1 before the prescribed period of time, and those whose current parameter values are below par1, and they are sequentially qualified to be selected.

Following the limitation control of the flow chart of FIG. 3, in accordance with the priority numbers of the candidates who have been qualified for the selection, any one of the candidates qualified for the selection is selected as a game target. For example, the candidate of the top priority is selected, the candidate whose priority number is smaller by one than a current selected candidate is selected, or the candidate whose priority number is higher by one than a current selected candidate is selected.

(The Limitation Based on Distance)

The control of the limitation based on distances in the selection qualification of game targets of the present embodiment will be explained with reference to FIGS. 4 and 5. FIG. 4 is the flow chart of the limitation control based on distances of this example, FIG. 5 is an explanatory view of the limitation control based on distances of this example.

In the limitation control based on distances according to this example, distances between a player character 52 and enemy characters 54, etc. in the game space 50 are used as a prescribed parameter. A distance as a prescribed parameter is more suitable to qualify candidates for the selection qualification as its value is smaller.

In the limitation control based on a distance according to this example, in principle, as shown in FIG. 5, a candidate whose distance is below len1 is qualified for the selection, and a candidate whose distance is above len1 is not qualified for the selection. However, as shown in FIG. 5, among the candidates whose distances are in the range of above len1 but below len2 (>len1), those whose distances were below len1 before a prescribed period of time are qualified for the selection, and the others whose distances were not below len1 are not qualified for the selection.

In this example, as shown in FIG. 5, candidates contained in a part of the game space in front of the game player 52 are subjected to this limitation processing, and candidates behind the game player 52 are not subjected to this limitation processing. When the game player wants to attack candidates behind him, the game player operates the play character 52 to face toward the candidates he wants to attack.

In this example, a distance of an enemy character 54 is measured from a position of the player character 52 as the base point. However, when the player character 52 is displayed on the display screen, a position which is a little behind the player character 52 can be the base point.

The limitation control based on distances according to this example will be explained with reference to the flow chart of FIG. 4.

Candidates (enemy characters, etc.) contained in the game space are in advance serially numbered 1, 2, 3, . . . as candidate numbers t.

First, a candidate number t which is used as a counter value in the limitation control is set at the initial value "1" (step S20).

Then, it is judged whether or not a parameter value of the candidate numbered t, i.e., a parameter value of the candidate t was below len1 before a prescribed period of time (step S21). When the parameter value was below len1 before the prescribed period of time, then it is judged whether or not a current parameter value of the candidate t is below len2 (step S22). When the current parameter value is below len2, step S25 follows, and otherwise, step S24 follows.

In step S21, when the parameter value of the candidate t was not below len1 before the prescribed period of time, then it is judged whether or not the current parameter value of the candidate t is below len1 (step S23). When the current parameter value is below len1, then step S25 follows, and otherwise, then step S25 follows.

When step S24 follows, the candidate t is omitted from candidates who are to be qualified for the selection to let him outside len1. When step S25 follows, the candidate t is qualified for the selection to let him inside len1 while candidates who have been so far qualified for the selection are numbered for priority in the order of increasing distances.

Then, 1 is added to the candidate number t (step S26). It is judged whether or not the candidate number t has reached n which is a total candidate number n (step S27), and the processing of steps S21-S27 is repeated until the candidate number t reaches n.

Following the limitation control of the flow chart of FIG. 4, in accordance with the priority numbers of the candidates who have been qualified for the selection, any one of the candidates qualified for the selection is selected as a game target. For example, the candidate of the top priority is selected, the candidate whose priority number is smaller by one than a current selected candidate is selected, or the candidate whose priority number is higher by one than a current selected candidate is selected.

According to this example, it can be prevented that candidates who are too far to attack are erroneously selected due to the failure to recognize distances to the candidates on the display screen.

According to this example, a candidate who has once entered the range of len1 are kept qualified for the selection until he is apart over some distance to len2, whereby a game player is not confused when candidates go in and out over the boundary defined by len1.

(The Limitation Based on Distances on Projected Display)

The control of limiting candidates, based on distances on a projected display in the selection qualification of game targets according to the present embodiment will be explained with reference to FIGS. 6 and 7. FIG. 6 is the flow chart of the control of the limitation based on distances according to this example. FIG. 7 is an explanatory view of the limitation control based on distances on a projected display according to this example.

In the limitation control based on distances according to this example, as shown n FIG. 7, a player character 52, and enemy characters 54, etc. are projected on a display 60, and the projected images are used. In FIG. 7, a projected image 52' of the player character 52 is the center of the projected display 60. As a prescribed parameter, a distance on the projected display 60 between the projected image 52' of the player character 52 and projected images 54' of candidates of enemy characters 54, etc. are used. Such distances are different from distances in the game space 50. The projected display 60 is set with the projected image 52' of the player character 52 centered. Distances on the projected display 60 as a prescribed parameter are more suitable for the selection qualification as the distances are smaller.

In the limitation control based on a distance according to this example, in principle, as shown in FIG. 7, a candidate whose distance is below len1 is qualified for the selection, and a candidate whose distance is above len1 is not qualified for the selection. However, as shown in FIG. 7, among the candidates whose distances are in the range of above len1 but below len2 (>len1), those whose distances were below len1 before a prescribed period of time are qualified for the selection, and the others whose distances were not below len1 are not qualified for the selection.

In this example, as shown in FIG. 7, candidates contained in a part of the game space in front of the game player 52 are subjected to this limitation processing, and candidates behind the game player 52 are not subjected to this limitation processing. When the game players wants to attack candidates behind him, the game player operates the play character 52 to face toward the candidates he wants to attack.

The limitation control based on distances according to this example will be explained with reference to the flow chart of FIG. 6.

Candidates (enemy characters, etc.) contained in the game space are in advance serially numbered 1, 2, 3, . . . as candidate numbers t.

First, a candidate number t which is used as a counter value in the limitation control is set at the initial value "1" (step S30).

Then, the projected image of the candidate numbered t, i.e., the candidate t is computed (step S31).

Then, it is judged whether or not the projected image of the candidate t is within the projection display 60 (Step S32). Unless the projected image of the candidate t is within the projection display 60, step S38 follows. When the projected image of the candidate t is within the projection display 60, the distance of the projected image of the candidate t from the center 52' of the display of the projected display 60 is computed (step S33).

Next, it is judged whether or not the distance of the projected image of the candidate t from the center of the projected display 60 was below len1 before a prescribed period of time (step S3). When the distance was below len1 before the prescribed period of time, it is judged whether or not the current distance of the candidate t is below len2 (step S35). When the current distance is below len2, step S37 follows, and otherwise, step S38 follows.

When the distance of the projected image 54' of the candidate t was not below len1 before the prescribed period of time, it is judged whether or not the current distance of the projected image 54' of the candidate t is below len1 (step S36). When the current distance is below len1, step S37 follows, and otherwise, step S38 follows.

When step S37 follows, the candidate t is qualified for the selection to thereby recognize the candidate t inside len1 while candidates including the candidate t who have been qualified for the selection are renumbered for priority in the order of increasing distances from the center of the display.

When step S38 follows, the candidate t is omitted from the candidates who are to be qualified for the selection to thereby recognize the candidate outside len1.

Then 1 is added to the candidate number t (step S39). It is judged whether or not the candidate number t has arrived at a total number n of the candidates (step S40). The processing of Steps S32 to S40 is repeated until the candidate number t arrives at n.

After the candidate limitation control following the flow chart of FIG. 6 has been completed, any one of the candidates who have been qualified for the selection is selected in the order of the priority numbers. For example, the candidate of the top priority is selected, the candidate whose priority number is smaller by one than a current selected candidate is selected, or the candidate whose priority number is higher by one than a current selected candidate is selected.

According to this example, candidates who are far from the center of the display are not selected, which never confuses the game players.

According to this example, a candidate who has once entered the range of len1 is kept qualified for the selection until he is apart over some distance to len2, whereby game players are not confused when candidates go in and out over the boundary defined by len1.

(The Limitation Based on Angles)

The limitation control based on angle in the selection qualification of game targets according to the present embodiment will be explained with reference to FIGS. 8 and 9. FIG. 8 is the flow chart of the limitation control based on angles according to this example. FIG. 9 is an explanatory view of the limitation control based on angles according to this example.

In the limitation control based on angles according to this example, as shown in FIG. 9, an angle α between a base line 64 extended in the direction where the play character 62 is looking forward and the lines 66 interconnecting the origin 62 and positions of the respective candidates is used. The angle which is counter-clockwise from the base line 64 is positive, and the angle which is clockwise from the base line is positive. The angle α in FIG. 9 is positive. The angle α which is a prescribed parameter is more suitable to qualify candidates for the selection qualification as the absolute value is smaller.

Angle 1 and Angle 2 which are references for the selection qualification are set to be positive when they are counter-clockwise and to be negative when they are clockwise.

In the limitation control based on angles according to this example, as shown in FIG. 9, in principle, a candidate whose angle α is below ang1 is qualified for the selection, and a candidate whose angle α is not below ang1 is not qualified for the selection. However, as shown in FIG. 9, among the candidates whose angles are in the range of above ang1 but below ang2 (>ang1), those whose angles were below ang1 before a prescribed period of time are qualified to be selected, and the others whose angles were not below ang1 are not qualified to be selected.

In this example, as shown in FIG. 9, candidates contained in a part of the game space in front of the game player 52 are subjected to this limitation processing, and candidates behind the game player 52 are not subjected to this limitation processing. When the game player wants to attack candidates behind him, the game player operates the play character 52 to face toward the candidates he wants to attack.

The limitation control based on angles according to this example will be explained with reference to the flow chart of FIG. 8.

Candidates (enemy characters, etc.) contained in the game space are in advance serially numbered 1, 2, 3, . . . as candidate numbers t.

First, a candidate number t which is used as a counter value in the limitation control is set at the initial value "1" (step S50).

Then, a candidate number t which is used as a counter value in the limitation control is set at "1" (step S50).

Then, it is judged whether or not an angle α of the candidate t was below ang1 before a prescribed period of time (step S52). When the angle α was below ang1 before the prescribed period of time, then it is judged whether or not a current angle α of the candidate t is below ang2 (step S53). When the current angle " is below ang2, step S55 follows, and otherwise, step S56 follows.

In step S52, when the angle α of the candidate t was not below ang1 before the prescribed period of time, then it is judged whether or not the current angle α of the candidate t is below ang1 (step S54). When the current angle α is below ang1 , then step S55 follows, and otherwise, then step S56 follows.

When step S55 follows, the candidate t is qualified for the selection to thereby recognize the candidate t inside ang1 while candidates including the candidate t who have been qualified for the selection are renumbered for priority in the order of increasing angles.

When step S56 follows, the candidate t is omitted from candidates who are to be qualified for the selection to thereby recognize the candidate t outside ang1.

Then, 1 is added to the candidate number t (step S57). It is judged whether or not the candidate number t has reached n which is a total candidate number (step S58), and the processing of steps S51-S58 is repeated until the candidate number t reaches n.

Following the limitation control of the flow chart of FIG. 6, in accordance with the priority numbers of the candidates who have been qualified for the selection, any one of the candidates qualified for the selection is selected as a game target. For example, the candidate of the top priority is selected, the candidate whose priority number is smaller by one than a current selected candidate is selected, or the candidate whose priority number is higher by one than a current selected candidate is selected.

According to this example, candidates are qualified for the selection arrangement, based on angles to the view point of a player character, which makes selections natural to attacks by the game player.

According to this example, a candidate who has once entered the range of ang1 are kept qualified for the selection until he is apart over some distance to ang2, whereby a game player is not confused when candidates go in and out over the boundary defined by ang1.

(The Limitation Based on Composite Conditions)

In the present embodiment, the control of limiting candidates to be qualified for the selection can be based on the above-described conditions of the single parameter, as of distances, angles, etc. described above, but can be based on combinations of the above-described conditions of the parameters.

In the limitation control following the flow chart of FIG. 10, the limitation control based on distances, which has been explained above with reference to FIGS. 4 and 5, is performed (step S10), and then the limitation control based on distances on a projected display, which has been explained above with reference to FIGS. 6 and 7, is performed (step S61). However, Step S60 and step S61 may be performed in the reverse order; the limitation control based on distances on a projected display, which has been explained with reference to FIGS. 6 and 7, and next the limitation control based on distances, which has been explained with reference to FIGS. 4 and 5, are performed.

In the limitation control following the flow chart of FIG. 11, the limitation control based on distances, which has been explained with reference to FIGS. 4 and 5, is performed (step S62), and then the limitation control based on angles, which has been explained with references to FIGS. 8 and 9, is performed (step S63). Step S62 and step S63 may be performed in the reverse order; the limitation control based on angles, which has been explained with reference to FIGS. 8 and 9, and next the limitation control based on distances, which has been explained with reference to FIGS. 4 and 5, is performed.

(The Limitation Based on Parameters (Part 2))

In the limitation control according to this example, prescribed parameters of candidates of enemy characters 54, etc. are used. The prescribed parameters of this example are more suitable to qualify the candidates as values of the prescribed parameters are smaller. That is, the prescribed parameters make it unnecessary to qualify the candidates for the selection when their values are too small. These prescribed parameters are, e.g., distances, angles, etc. as in the limitation control (Part 1) described above.

The prescribed parameters are used for weapons, e.g., arrows, which aim over long distances. It is difficult to shoot near enemy characters but easier to shoot remote enemy characters. In such case, it is necessary that distances are a parameter, and larger distances qualify enemy characters for the selection.

The prescribed parameters are used for weapons, such as bombs, which damage large areas. When a bomb reaches near a game player character, he himself is damaged. It is necessary to qualify enemy characters who are some remote from a game player character.

In the limitation control according to this example, in principle, candidates whose parameter values are above par2 are qualified for the selection, and candidates whose parameter values are not above par2 are not qualified for the selection. Among the candidates whose parameter values are above part 1 (<par2) but below part 2, those whose parameter values were above par2 before a prescribed period of time are qualified for the selection, and the others of the candidates are not qualified for the selection.

The limitation control according to this example will be explained with reference to the flow chart of FIG. 12. Candidates (enemy candidates, etc.) contained in the game space are in advance serially numbered (1, 2, 3, . . . ).

First, a candidate number t which is used as a counter value in the limitation control is set at the initial value "1" (step S70).

Then, it is judged whether or not the parameter value of a candidate of the candidate number t, i.e., a candidate t was above par2 before the prescribed period of time (step S71). When the parameter value was above par2 before the prescribed period of time, it is continuously judged whether or not a current parameter value of the candidate t is above par1 (step S72). When the current parameter value is above par1, step S75 follows, and otherwise, step S74 follows.

When it is judged in step S71 that the parameter value of the candidate t was not above par2 before the prescribed period of time, it is continuously judged whether or not the current parameter value of the candidate t is above par2 (step S73). When the current parameter value is above par2, step S75 follows, and otherwise, step S74 follows.

When step S74 follows, the candidate t is omitted from candidates who are to be qualified for the selection. When step S75 follows, the candidate t is qualified for the selection while candidates including the candidate t who have been qualified for the selection are serially renumbered for priority in the order of decreasing parameter values.

Then, "1" is added to the candidate number t (step S76), and it is judged whether or not the candidate number t has reached a total candidate number n (step S77). The processing of steps S71-S77 is repeated until the candidate number t reaches n.

In the flow chart of FIG. 12, it is judged first whether or not the parameter value of the candidate t was above par2 before a prescribed period of time, and then it is judged whether or not the current parameter value of the candidate t is above par1 or par2, but this is not essential.

For example, it is possible to judge first whether the current parameter value of the candidate t is below part, is above part 1 but below part 2, or is above part 2, and then judge whether or not the parameter value of the candidate t was above par2 before the prescribed period of time. Thus, the candidates are limited to those whose parameter values are above par1 and below par2, but were above par2 before the prescribed period of time, and whose current parameters are above par2, and the limited candidates are sequentially qualified for the selection.

After the control of limiting candidates in accordance with the flowchart of FIG. 12, anyone of the candidates qualified for the selection is selected as a game target in the order of the priority numbers. For example, the candidate of the top priority is selected, the candidate whose priority number is smaller by one than a current selected candidate is selected, or the candidate whose priority number is higher by one than a current selected candidate is selected.

[Modified Embodiments]

The present invention is not limited to the above-described embodiment and can cover other various modifications.

The present invention is applied to a domestic game apparatus as an information processing system. However, the present invention is applicable to terminal devices installed in stores, such as game centers, game cafes, etc., portable game apparatuses, electronic devices, such as personal computers, etc., at homes, portable terminals, such as portable telephones, PHS, PDA, etc., and others.

What is claimed is:

1. A non-transitory computer readable storage medium with an executable game program stored thereon, the program instructs a computer to:

(a) provide an action game space in which a player character moves in response to an operation of a game player and in which a plurality of target characters are arranged as attack targets;

(b) display a game scene with the plural target characters arranged within a visual range viewed from the player character, on a monitor display connected to the computer;

(c) set a first zone, a second zone set outside of and next to the first zone, and an outer zone set outside of and next to the second zone at every time when the player character moves in the game space, wherein said first, second and outer zones are defined within said visual range based on one of distances from a reference point and angles from a reference line, which reference point or line is defined based on the current location of the player character, so that said first zone is nearest to the reference point or line;

(d) judge a current location with respect to each of said plurality of target characters displayed within the visual range;

(e) select any target character which is currently in the first zone and any target character which is currently in the second zone but was in the first zone at a certain time, said selection omits any target character which is currently in the outer zone and any target character which has moved in the second zone from the outer zone at said certain time;

(f) decide recommended priorities of selections to the respective target characters selected at (e) as candidate objects for attack in accordance with the current locations so that the candidate object located nearer to the reference point or line is given with the higher priority;

(g) allow the player to change selection of the candidate object for attack sequentially in accordance with the order of the priorities from a higher priority to a lower priority in response to operation by the game player; and (h) allow the player to attack the object selected at (g).

2. The non-transitory computer readable storage medium according to claim 1, wherein when at least one of said plurality of target characters becomes ineffective as an attack target, the order of the priorities among the candidates objects is re-decided.

3. The non-transitory computer readable storage medium according to claim 1, wherein the target characters appearing in the game space are increased or decreased in accordance with advance of the game in response to operations of the game player.

4. The non-transitory computer readable storage medium according to claim 1,
wherein said reference point is set at a point at which the player character is currently located in said game space, and
wherein said recommended priorities are decided based on distances of the target characters from said reference point, respectively.

5. The non-transitory computer readable storage medium according to claim 1,
wherein said reference point is set as a point set in said game space corresponding to a center point of a game display image, and
wherein said recommended priorities are decided based on distances of the target characters from said reference point, respectively.

6. An electronic device provided with a controller operable by a game player and configured to display game scenes of an action game progressing in a game space in response to the operation on the controller, the electronic device being configured to perform:

(a) providing the game space with a player character, which moves in the game space in response to an operation of the game player, and a plurality of target characters which are arranged in the game space to be attackable from the player character;

(b) displaying a game scene with the plural target characters arranged within a visual range viewed from the player character, on a monitor display connected to the electronic device;

(c) setting a first zone, a second zone set outside of and next to the first zone, and an outer zone set outside of and next to the second zone at every time when the player character moves in the game space, wherein said first, second and outer zones are defined within said visual range based on one of distances from a reference point and angles from a reference line, which reference point or line is defined based on the current location of the player character, so that said first zone is nearest to the reference point or line;

(d) judging a current location with respect to each of said plurality of target characters displayed within the visual range;

(e) selecting any target character which is currently in the first zone and any target character which is currently in the second zone but was in the first zone at a certain time, said selection omits any target character which is currently in the outer zone and any target character which has moved in the second zone from the outer zone at said certain time;

(f) deciding recommended priorities of selections to the respective target characters selected at (e) as candidate objects for attack in accordance with the current locations so that the candidate object located nearer to the reference point or line is given with the higher priority;

(g) allowing the player to change selection of the candidate object for attack sequentially in accordance with the order of the priorities from a higher priority, in response to operation by the game player; and (h) allowing the player to attack the object selected at (g).

7. An electronic device according to claim 6,
wherein said reference point is set at a point at which the player character is currently located in said game space, and
wherein said recommended priorities decided based on distances of the target characters from said reference point, respectively.

8. An electronic device according to claim 6,
wherein said reference point is set at a point set in said game space corresponding to a center point of a game display image, and
wherein said recommended priorities are decided based on distances of the target characters from said reference point, respectively.

* * * * *